F. HILDEBRANDT.
SELF DISCHARGING RECEPTACLE.
APPLICATION FILED NOV. 29, 1921.

1,433,009.

Patented Oct. 24, 1922.

Inventor
Ferdinand Hildebrandt

Patented Oct. 24, 1922.

1,433,009

UNITED STATES PATENT OFFICE.

FERDINAND HILDEBRANDT, OF ESSEN, GERMANY, ASSIGNOR TO FRIED. KRUPP AKTIENGESELLSCHAFT, OF ESSEN-ON-THE-RUHR, GERMANY.

SELF-DISCHARGING RECEPTACLE.

Application filed November 29, 1921. Serial No. 518,721.

*To all whom it may concern:*

Be it known that I, FERDINAND HILDEBRANDT, residing at Essen, Germany, a citizen of the German Republic, have invented a certain new and useful Improvement in Self-Discharging Receptacles, of which the following is a specification.

The present invention relates to self-discharging receptacles with a bottom which can be tilted towards both sides and the invention consists in providing the bottom with two thrust crank gears one of which is intended to tilt the bottom to one side and the other to tilt the bottom to the other side, and each of which has a connecting rod which consists of two parts which are pivotally connected together and can be locked relatively to each other.

The invention will be described with reference to an example of construction shown in the accompanying drawing in which—

Figure 1:
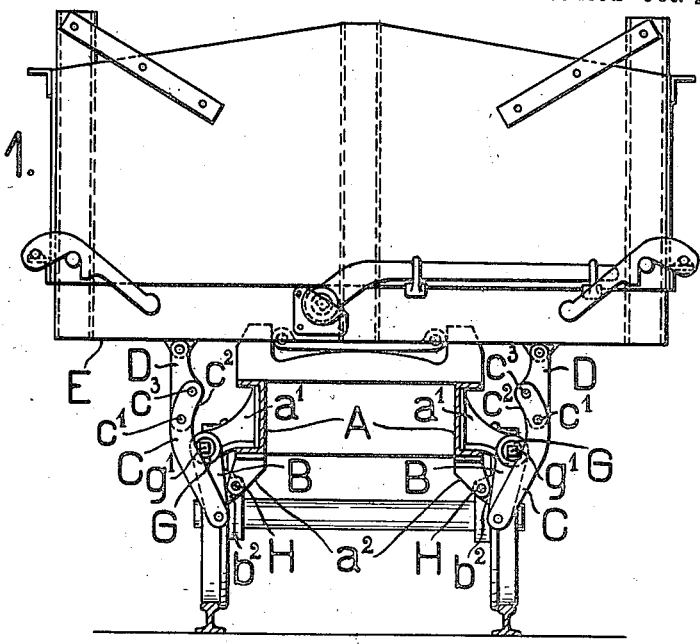
Figure 2:
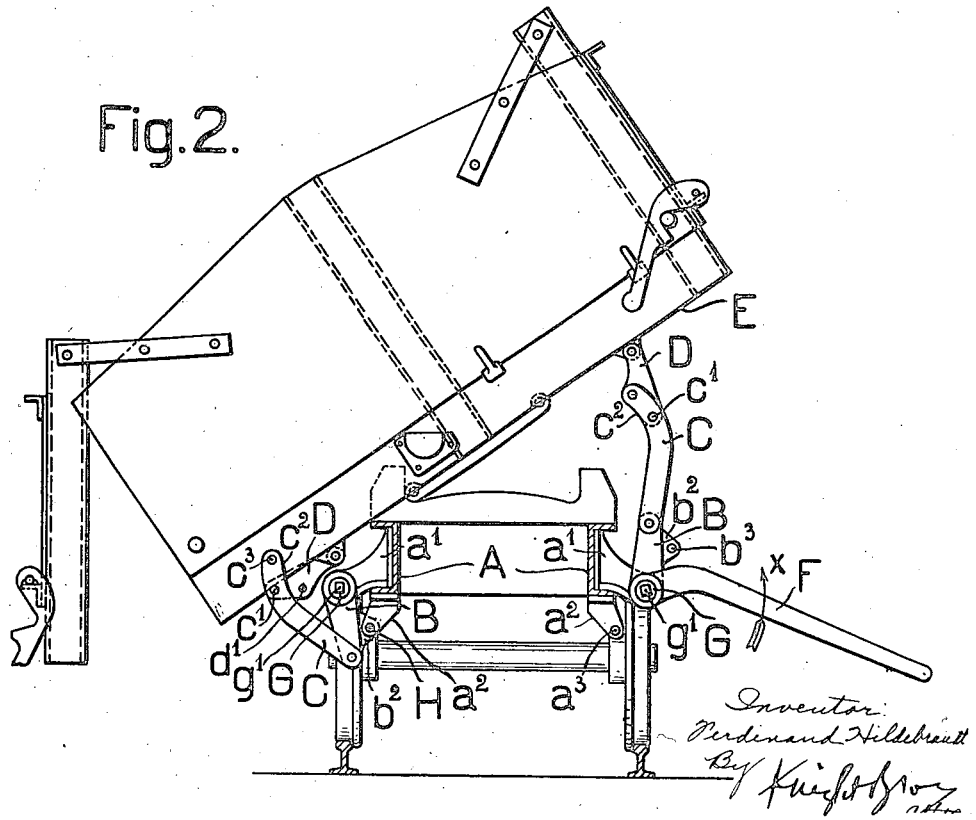

Fig. 1 is an end view, partially in section, of a self-discharging railway car and Fig. 2 is a view corresponding to Fig. 1 of the car in a discharging position.

On the underframe A of the car and on both sides of the central longitudinal plane thereof are fixed bearing brackets $a^1$ in which shafts G, which carry cranks B, and run from end to end of the car, are mounted to rotate. The ends of these shafts G have square extensions $g^1$ which project at the sides beyond the bearing brackets $a^1$ and are provided to push a hand lever F (see Fig. 2) onto. The cranks B have side lugs $b^2$ which are provided with holts $b^3$ (see Fig. 2). On the underframe A of the car there are further arranged brackets $a^2$ having apertures $a^3$, the arrangement being such that the axes of the apertures $a^3$ are the same distance from the axes of rotation of the cranks B as the axes of the apertures $b^3$ in the lugs $b^2$. To the cranks B are pivoted connecting rods C which are pivoted by means of pins $c^1$ to the crank arms D rotatably mounted on the bottom E of the self-discharging car. The connecting rods C carry extensions $c^2$ which are provided with apertures $c^3$. The crank arms D have likewise apertures $d^1$ (see Fig. 2) the axes of which are the same distance from the axes of the pins $c^1$ as the apertures $c^3$ of the connecting rods C.

In the loading position the parts assume the position shown in Fig. 1, in which the apertures $c^3$ and $d^1$ and the borings $a^3$ and $b^3$ are exactly opposite each other. Through the apertures $a^3$ $b^3$ are passed key bolts H, which secure the cranks B to the underframe A. The crank gears B C D assume a dead position in which they prevent any movement of the bottom E of the car relatively to the underframe A.

When the car is to be discharged to one side, i. e. the left hand side, the key bolts H on the right hand side of the car are first removed and inserted in the coinciding borings $c^3$ and $d^1$ situated on the same side, so that the connecting rods C and the crank arms D form a rigid whole. The hand lever F is next placed on one of the extensions $g^1$ of the right hand shaft G and is rotated in the direction indicated by the arrow $x$ (see Fig. 2) until the crank gears B C D on the right hand side of the car have reached their extended position. The crank gears B C D lying on the left hand side of the car double up during the course of the discharging movement of the bottom E about the pivot pins $c^1$ the crank arms D bearing against the bottom E. The method of procedure when bringing the bottom E back into the loading position and when discharging to the right hand side is obvious from the description given above.

I claim—

1. In a self-discharging receptacle provided with a bottom tiltable toward both sides, thrust crank gears for tilting the bottom to one side or the other, each set of thrust crank gears embodying a pair of pivoted connecting members and key-bolt and aperture means for locking a pair of connecting members relatively to each other.

2. In a self-discharging receptacle provided with a bottom tiltable toward both sides, two sets of thrust crank gears operatively connected to the bottom for tilting the same, each set of crank gears embodying a two-part connecting member pivotally united and releasable means embodying a key-bolt and apertures for locking the parts of said connecting member relatively to each other.

The foregoing specification signed at Essen, Germany, this 19th day of October, 1921.

FERDINAND HILDEBRANDT.